United States Patent
Lee et al.

(10) Patent No.: US 6,303,049 B1
(45) Date of Patent: Oct. 16, 2001

(54) CHEMICAL MECHANICAL ABRASIVE COMPOSITION FOR USE IN SEMICONDUCTOR PROCESSING

(75) Inventors: Tsung-Ho Lee, Ping Tong Hsien; Tsui-Ping Yeh, Kaohsung; Hung-Wen Chiou, Hsinchu, all of (TW)

(73) Assignee: Eternal Chemical Co., Ltd. (TW)

( * ) Notice: Subject to any disclaimer, the term of this patent is extended or adjusted under 35 U.S.C. 154(b) by 0 days.

(21) Appl. No.: 09/418,328

(22) Filed: Oct. 14, 1999

(30) Foreign Application Priority Data

Sep. 1, 1999 (TW) .............................. 88115047

(51) Int. Cl.$^7$ .................................................. C09K 13/00
(52) U.S. Cl. ...................... 252/79.1; 252/79.2; 252/79.3
(58) Field of Search .............................. 438/690, 691, 438/692, 693; 252/79.1, 79.2, 79.3

(56) References Cited

U.S. PATENT DOCUMENTS

| | | | |
|---|---|---|---|
| 4,959,113 | 9/1990 | Roberts | 156/345 |
| 5,084,071 | 1/1992 | Nenadic et al. | 51/309 |
| 5,114,437 | 5/1992 | Takeuchi et al. | 51/293 |
| 5,209,816 | 5/1993 | Yu et al. | 156/345 |
| 5,225,034 | 7/1993 | Yu et al. | 156/345 |
| 5,336,542 | 8/1994 | Wirth | 428/73 |
| 5,340,370 | 8/1994 | Cadien et al. | 156/345 |
| 5,366,542 | 11/1994 | Yamada et al. | |
| 5,391,258 | 2/1995 | Brancaleoni et al. | 51/308 |
| 5,516,346 | 5/1996 | Cadien et al. | 51/308 |
| 5,783,489 | * 7/1998 | Kaufman et al. | 438/692 |
| 5,858,813 | * 1/1999 | Scherber et al. | 438/693 |
| 5,954,997 | * 9/1999 | Kaufman et al. | 252/79.1 |

FOREIGN PATENT DOCUMENTS

WO 96/16436   5/1996   (WO).

* cited by examiner

*Primary Examiner*—Benjamin L. Utech
*Assistant Examiner*—Lan Vinh
(74) *Attorney, Agent, or Firm*—Scully, Scott, Murphy & Presser

(57) ABSTRACT

The invention provides a chemical-mechanical abrasive composition for semiconductor processing, which composition is characterized by comprising a water-soluble anionic chemical. According to the invention, said water-soluble anionic chemical would be coated on the surface of a metal film during the polishing of said metal film so as to inhibit the formation of depressions on the resultant metal circuits. In another aspect, the invention provides a chemical-mechanical abrasive composition in the form of a slurry comprising 70–99.5% by weight of an aqueous medium; 0.1–25% by weight of an abrasive particle; 0.01–2.0% by weight of an abrasion enhancer; and 0.01–1% by weight of a water-soluble anionic chemical. The chemical-mechanical abrasive composition of the invention may further comprise an oxidant to enhance the abrasion rate.

7 Claims, 1 Drawing Sheet

CHEMICAL MECHANICAL ABRASIVE COMPOSITION FOR USE IN SEMICONDUCTOR PROCESSING

BACKGROUND OF THE INVENTION

1. Field of the Invention

The invention pertains to a chemical mechanical abrasive composition. The chemical mechanical abrasive composition is useful in polishing the surface of a semiconductor wafer.

2. Description of the Prior Art

Chemical mechanical polishing (CMP) is a planarization technique which was developed to address the problem associated with the difficulty in focus during a photolithography process for producing integrated circuits owing to the difference in the height of deposited films. Chemical mechanical polishing technique was first applied to the production of the elements with a size in the order of 0.5 microns. With the reduction in the size of elements, the chemical mechanical polishing technique was applicable to an increased number of layers. Until the elements were developed to the order of 0.25 microns, the chemical mechanical polishing became a main and essential planarization technique. In general, the polishing method for producing a wire circuit comprises mounting a semiconductor wafer on a spinning platen equipped with an abrasive head and applying an abrasive slurry comprising abrasive particles and an oxidant to the surface of the wafer to enhance the abrasion efficacy.

U.S. Pat. No. 5,225,034 discloses a chemical mechanical abrasive slurry which comprises $AgNO_3$, solid abrasive particles, and an oxidant selected from $H_2O_2$, HOC1, KOC1, $KMgO_4$, or $CH_3COOOH$. The slurry is used for polishing a copper layer on a semiconductor wafer so as to produce a copper wire on the wafer.

U.S. Pat. No. 5,209,816 discloses a method for polishing an Al— or Ti— containing metal layer with a chemical mechanical abrasive slurry. The abrasive slurry contains, in addition to a solid abrasive material, about 0.1–20% by volume of $H_3PO_4$ and about 1–30% by volume of $H_2O_2$.

U.S. Pat. No. 4,959,113 discloses a method of using an aqueous abrasive composition for polishing metal surfaces. The aqueous abrasive composition comprises water, an abrasive, e.g. $CeO_2$, $Al_2O_3$, $ZrO_2$, $TiO_2$, $SiO_2$, SiC, $SnO_2$, or TiC, and a salt including a metal cation of Group IIA, IIIA, IVA or IVB and an anion of chloride, bromide, iodide, nitrate, sulfate, phosphate or perchlorate. This patent also discloses the use of hydrochloric acid, nitric acid, phosphoric acid or sulfuric acid to adjust the pH of the abrasive composition to be in the range of 1 to 6.

U.S. Pat. No. 5,391,258 discloses an abrasive composition for polishing silicon, silica or silicate composite. The abrasive composition comprises, in addition to abrasive particles, hydrogen peroxide and potassium hydrogen phthalate.

U.S. Pat. No. 5,114,437 discloses a polishing composition for an aluminum substrate comprising an alumina polishing agent having an average particle size of 0.2 to 5 $\mu$m, and a polishing accelerator selected from the group consisting of chromium(III) nitrate, lanthanum nitrate, ammonium cerium (III) nitrate, and neodymium nitrate.

U.S. Pat. No. 5,084,071 discloses a chemical mechanical polishing slurry for an electronic component substrate. The polishing slurry comprises no more than I weight percent of alumina, abrasive particles (e.g. $SiO_2$, $CeO_2$, SiC, $Si_3N_4$, or $Fe_2O_3$ particles), a transition metal chelated salt (e.g. ammonium iron EDTA) for use as a polishing accelerator, and a solvent for said salt.

U.S. Pat. No. 5,336,542 discloses a polishing composition comprising alumina abrasive particles and a chelating agent selected from the group consisting of polyaminocarboxylic acid (e.g. EDTA) and sodium and potassium salts thereof. The composition may further comprise beohmit or an aluminum salt.

U.S. Pat. No. 5,340,370 discloses a chemical mechanical polishing slurry for tungsten or tungsten nitride film, which comprises an oxidizing agent such as potassium ferricyanide, an abrasive, and water, and has a pH between 2 and 4.

U.S. Pat. No. 5,516,346 discloses a slurry for chemical mechanically polishing a titanium film, said slurry comprising potassium fluoride in a concentration sufficient to complex said titanium film and an abrasive such as silica, and having a pH less than eight WO 96/16436 discloses a chemical mechanical polishing slurry which comprises abrasive particles having a median particle diameter less than 0.400 microns, a ferric salt oxidant, and an aqueous surfactant suspension of a mixture of propyleneglycol and methylparaben.

The salts generally used to accelerate the abrasion rate include ferric ions (such as $Fe(NO_3)$ and $K_3Fe(CN)_6$) or potassium ions (such as $KIO_3$). However, these metal ions would contaminate wafers and CMP device so as to necessitate subsequent cleaning steps and to reduce shelf life of the CMP device. In addition, potassium ions are so mobile that they will penetrate dielectric layers so as to reduce the reliability of IC.

In the process for producing integrated circuits, Ta or TaN film is most commonly used to enhance the adhesion of copper to a silica insulator layer. Moreover, Ta or TaN film is also commonly used as a barrier metal film. In theory, Ta or TaN should be polished in a rate close to that of copper. Nevertheless, since Ta has a high chemical resistance and is hard to be oxided, effective polishing of Ta is usually difficult to be achieved in the process for producing copper circuits. Furthermore, since the barrier film is hard to be removed by polishing, this normally causes depressions on copper circuits.

Accordingly, in semiconductor processing, need still exists for abrasive compositions which are more economical, have high polishing performance, and are able to reduce depressions on metal circuits.

SUMMARY OF THE INVENTION

The present invention provides a chemical mechanical abrasive composition for semiconductor processing, which composition is characterized by comprising a water-soluble anionic chemical. The water-soluble anionic chemical can be coated on the surface of a metal film during the polishing of said metal film so as to eliminate the formation of depressions on the resultant metal circuits.

In another aspect, the present invention provides a chemical mechanical abrasive composition in the form of a slurry comprising 70–99.5% by weight of an aqueous medium; 0.1–25% by weight of an abrasive; 0.01–2.0% by weight of an abrasion enhancer; and 0.01–1% by weight of a water-soluble anionic chemical. The chemical mechanical abrasive composition may further comprise an oxidant to enhance the abrasion rate.

DETAILED DESCRIPTION OF THE INVENTION

Figure 1:
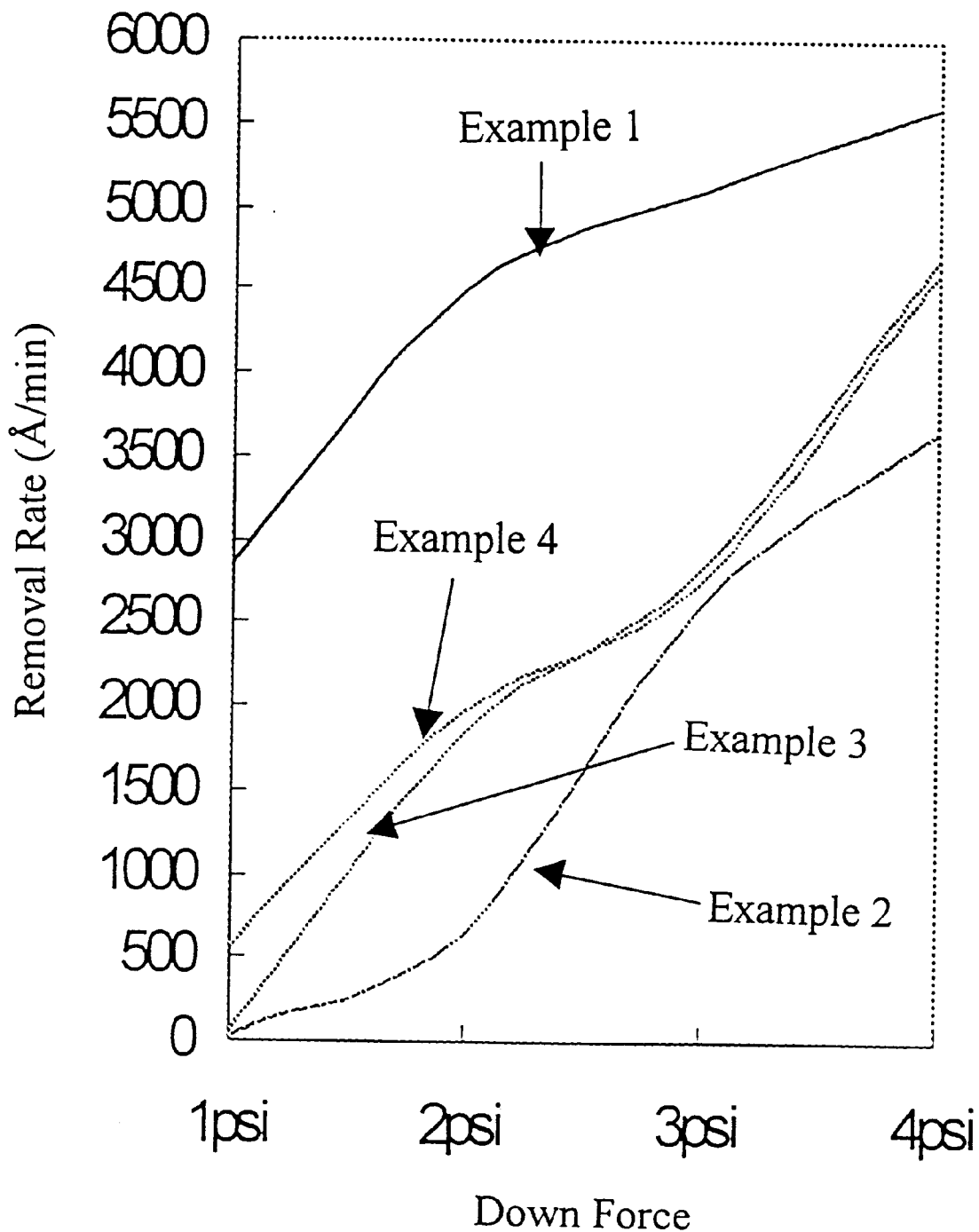
FIG. 1 is a graph showing the copper removal rate at various down forces for the slurries exemplified in the examples.

The present invention provides a chemical mechanical abrasive composition for semiconductor processing, which composition is characterized by comprising a water-soluble anionic chemical. According to the invention, said anionic chemical can be coated on or cover the surface of a metal film, such as a copper film, during the polishing of said metal film so as to eliminate the formation of depressions on the resultant metal circuits in chemical mechanical polishing.

The anionic chemical used in the invention can be any chemical which is effectively coated on the surface of a metal film. The anionic chemical may preferably comprise an acrylic-, phosphate-, sulfate-, or sulphonate-containing compound (e.g., ammonium alkyl phosphate, ammonium alkyl sulphonate, and ammonium alkyl sulfate), polymer or copolymer, or a mixture of two or more of these compound, polymer and copolymer.

According to one embodiment of the present invention, the chemical mechanical abrasive composition can be prepared to be in the form of a slurry, which comprises 70–99.5% by weight of an aqueous medium; 0.1–25% by weight, preferably 0.5–15% by weight, and more preferably 0.5–8% by weight of an abrasive; 0.01–2.0% by weight, preferably 0.01–1.0% by weight, and more preferably 0.1–1.0% by weight of an abrasion enhancer; and 0.01–1% by weight, preferably 0.03–0.5% by weight, and more preferably 0.08–0.5% by weight of a water-soluble anionic chemical. According to the present invention, the chemical mechanical abrasive composition in the form of a slurry may further comprise an oxidant.

The abrasive used in the abrasive slurry of the invention can be any commercially available abrasive agent in particle form, such as $SiO_2$, $Al_2O_3$, $ZrO_2$, $CeO_2$, SiC, $Fe_2O_3$, $TiO_2$, $Si_3N_4$, or any mixture thereof These abrasive agents normally have a high purity, a high surface area, and a narrow particle size distribution, and thus are suitable for use in abrasive compositions as abrasive agents.

The abrasion enhancer used in the abrasive slurry of the invention can be any known in the art as being able to enhance the abrasion rate of an abrasive slurry in semiconductor processing. The abrasion enhancer used in the abrasive slurry of the invention may be a combination of (a) a component selected from phosphorous acid, a salt thereof, or a mixture of the acid and salt; (b) a component selected from an amino acid, a salt thereof, a carboxylic acid, a salt thereof, or a mixture of the acids and/or salts, wherein the amino acid may for example be selected from glycine, creatine, or alanine, and the carboxylic acid may for example be selected from formic acid, acetic acid, propionic acid, butyric acid, valeric acid, hexanoic acid, malonic acid, glutaric acid, adipic acid, citric acid, malic acid, tartaric acid, or oxalic acid.

The chemical mechanical abrasive composition of the present invention may use water as a medium. In the preparation of the abrasive composition, water, and preferably conventional deionized water, may be used to make the abrasive composition into a slurry.

The chemical mechanical abrasive composition of the present invention may further comprise other ingredients which are conventionally used in chemical mechanical abrasive compositions, only if they do not cause any adverse effect on the abrasive composition of the present invention. For example, in a copper production process, the abrasive composition of the present invention may include benzotriazole and/or its derivatives to protect copper from rapid corrosion.

If an abrasive slurry prepared according to the invention contains 80–99.5% by weight of deionized water, the solid content of the slurry may be in the range from 0.5 to 15% by weight, preferably from 0.5 to 10% by weight, and more preferably from 0.5 to 5% by weight. The additives described above are then introduced into the resultant slurry and the pH of the slurry is adjusted with an acid or base to be in the desired range.

The present invention will be further described by, but not limited to, the following examples. Any modifications or changes with reference to the present invention which can be easily accomplished by persons skilled in the art will be covered in the domain of the present invention.

EXAMPLES

| Abrasion Test | |
|---|---|
| A. Apparatus: | IPEC/Westech 472 |
| B. Conditions: | Pressure: 4 psi |
| | Back pressure: 0.5 psi |
| | Temperature: 25° C. |
| | Spindle speed: 55 rpm |
| | Platen speed: 50 rpm |
| | Pad type: Rodel: IC 1400 |
| | Slurry flow: 150 ml/min |
| C. Wafer: | Cu film: commercially available from Silicon Valley Microelectronics, Inc., which is obtained by depositing a thermal oxide of silica with a thickness of 1000 Å, Ta film with a thickness of 300 Å, and copper film with a thickness of 10000 Å ± 5% on a 6 inches silicon wafer |
| D. Slurry: | Prepared by mixing each of the slurries of the following examples with 30% $H_2O_2$ at a volume ratio of 9:1, and uniformly agitating the resultant mixtures |

Abrasion Test Procedure

Both before and after abrasion test, the thickness of the wafer to be polished should be measured by a thickness measuring means. The sheet resistivity of the metal film is measured by a 4-point probe. The thickness of the film is determined by the following equation:

$$T \times R = \text{resistivity coefficient}$$

wherein T represents film thickness (Å), and R represents sheet resistivity ($\Omega/cm^2$). For various metal films, the resistivity coefficient will be a constant.

The present invention used Model RS 75 of KLA-Tencor Company to determine the metal film thickness. The abrasion rate is determined as follows:

A metal film thickness $T_2$, is first determined by the apparatus of Model RS75. The film is polished by an exemplified slurry under the above-mentioned conditions for 1 minute. Thereafter, the wafer is cleaned by the apparatus of Evergreen Model 10X of Solid State Equipment Corporation. After spray-drying the wafer, a metal film thickness $T_2$ is measured by the apparatus of Model RS75. The abrasion rate of the metal film for the exemplified slurry is represented by $T_1$-$T_2$.

EXAMPLE 1

An abrasive slurry was prepared by using colloidal silica as the abrasive. The resultant slurry has the following constitution:

colloidal silica: 3.0% by weight;
benzotriazole (BTA): 0.1% by weight;
phosphorous acid: 0.2% by weight
glycine: 0.2% by weight;
an acid or base to adjust the pH and deionized water: the balance.

The results of abrasion test of the resultant abrasive slurry are listed in Table 1.

EXAMPLE 2

An abrasive slurry having a constitution similar to that of Example 1 was prepared except that 0.045% by weight of Rhone-Poulenc RS-610 (which is a phosphate-containing copolymer) was additionally added to the slurry.

The results of abrasion test of the resultant abrasive slurry are listed in Table 1.

EXAMPLE 3

An abrasive slurry having a constitution similar to that of Example 1 was prepared except that 0.045% by weight of ammonium dodecyl sulfonate was additionally added to the slurry.

The results of abrasion test of the resultant abrasive slurry are listed in Table 1.

EXAMPLE 4

An abrasive slurry having a constitution similar to that of Example 1 was prepared except that 0.045% by weight of Rhone-Poulenc RE-610 (which is a phosphate-containing copolymer) was additionally added to the slurry.

The results of abrasion test of the resultant abrasive slurry are listed in Table 1.

TABLE 1

| abrasive slurry | abrasive | solid content % | anionic chemical | pH | copper removal rat (Å/min) | | | |
|---|---|---|---|---|---|---|---|---|
| | | | | | 4 psi | 3 psi | 2 psi | 1 psi |
| Example 1 | colloidal silica | 3 | — | 3.5–4.0 | 5601 | 5081 | 4496 | 2864 |
| Example 2 | colloidal silica | 3 | RS-610 of RHONE-POULENC | 3.5–4.0 | 3665 | 2609 | 647 | 21 |
| Example 3 | colloidal silica | 3 | ammonium dodecyl sulfonate | 3.5–4.0 | 4686 | 2822 | 1851 | 63 |
| Example 4 | colloidal silica | 3 | RE-610 of RHONE-POULENC | 3.5–4.0 | 4602 | 2744 | 1961 | 569 |

FIG. 1 shows the copper removal rates for the exemplified slurries at various down forces based on the data in Table 1. FIG. 1 reveals that the abrasive composition of the present invention which comprises an anionic chemical can effectively reduce the metal removal rate at lower pressures so as to inhibit the formation of depressions on the metal.

We claim:

1. A chemical mechanical abrasive slurry comprising:
   70–99.5% by weight of an aqueous medium;
   0.1–25% by weight of an abrasive;
   0.01–2% by weight of a combination of (a) a compound selected from the group consisting of phosphorous acid, a salt thereof and a mixture of said acid and said salt and (b) a component selected from the group consisting of an amino acid, a salt of an amino acid, a carboxylic acid, a salt of a carboxylic acid and a mixture of two or more of the above components; and
   0.01–1% by weight of a water-soluble anionic chemical.

2. The slurry according to claim 1 wherein the abrasive is selected from the group consisting of $SiO_2$, $Al_2O_3$, $ZrO_2$, $CeO_2$, SiC, $Fe_2O_3$, $TiO_2$, $Si_3N_4$ and mixtures thereof.

3. The slurry according to claim 1 wherein the anionic chemical comprises an acrylate-, phosphate-, sulfate-, or sulphonate-containing compound, polymer and/or copolymer, or a mixture of two or more of the compound, polymer and/or copolymer.

4. The slurry according to claim 1 wherein said amino acid is selected from the group consisting of glycine, creatine, and alanine.

5. The slurry according to claim 1 wherein said carboxylic acid is selected from the group consisting of formic acid, acetic acid, propionic acid, butyric acid, valeric acid, hexanoic acid, malonic acid, glutaric acid, adipic acid, citric acid, malic acid, tartaric acid and oxalic acid.

6. The slurry according to claim 1 further comprising a triazole compound and/or a derivative thereof.

7. The slurry according to claim 1 further comprising an oxidant.

* * * * *